July 8, 1941.  T. S. VOSBIKIAN ET AL  2,248,796
SHEARS
Filed May 25, 1939
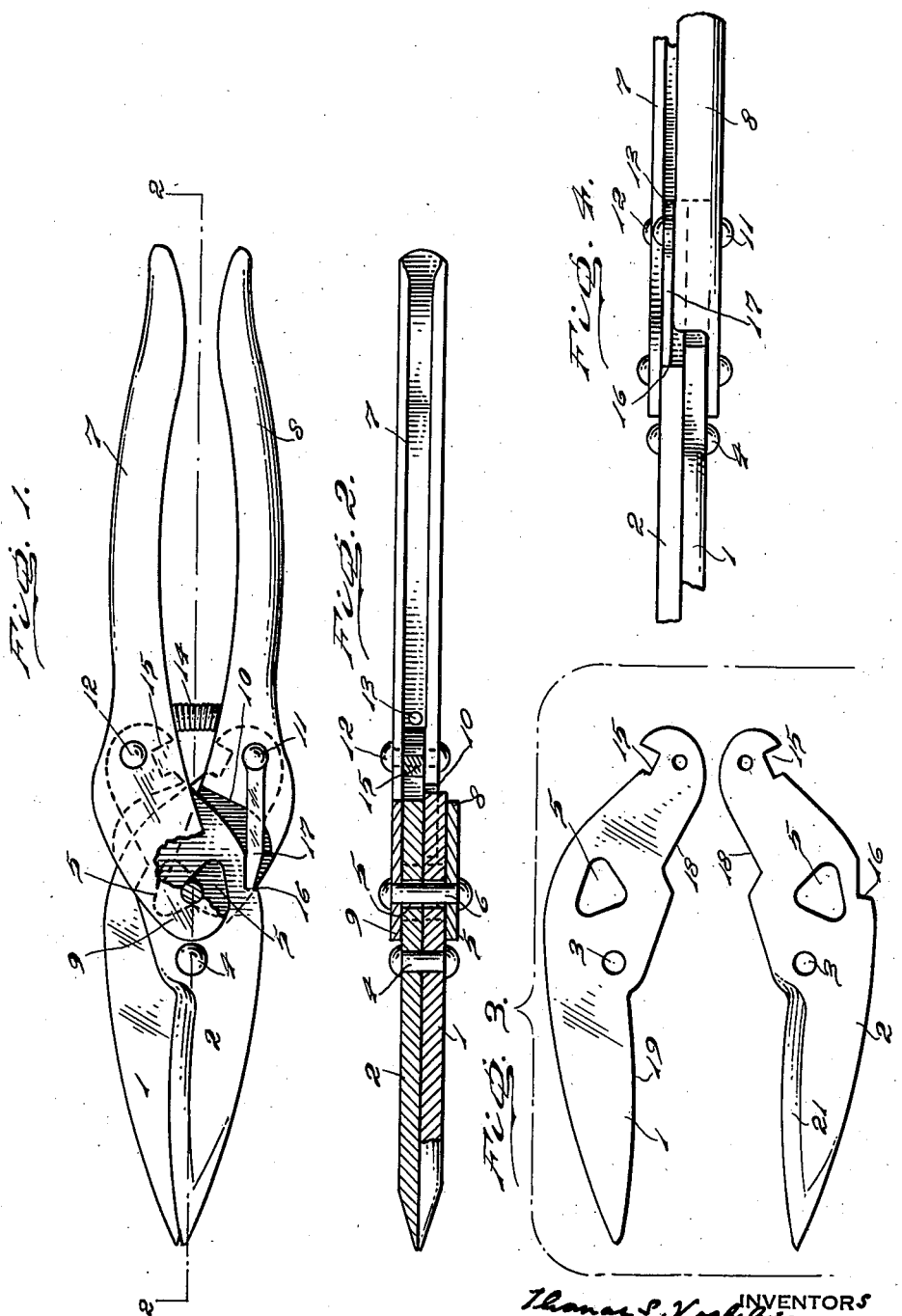
INVENTORS
Thomas S. Vosbikian
Peter S. Vosbikian
BY
Herbert S. Fairbanks
ATTORNEY Patented July 8, 1941

2,248,796

UNITED STATES PATENT OFFICE 2,248,796

SHEARS

Thomas S. Vosbikian and Peter S. Vosbikian, Philadelphia, Pa.

Application May 25, 1939, Serial No. 275,586

4 Claims. (Cl. 30—252)

The object of our invention is to devise a novel construction of shears which provides a very powerful leverage so that it can be used for cutting metal sheets and strips.

One handle is fixed to one blade and the other handle is pivoted to the other blade and provided with a novel leverage therewith to effect the turning movement of the blades on a fixed pivot which connects them.

With the above and other objects in view which will hereinafter more clearly appear, our invention comprehends novel shears which are especially adapted to be used as tinners' snips.

Other novel features of construction and advantage will hereinafter more clearly appear in the detailed description and the appended claims.

For the purpose of illustrating our invention, we have shown in the accompanying drawing, a preferred embodiment of it, which, in practice, will give satisfactory and reliable results. It is, however, to be understood that this embodiment is typical only and the various instrumentalities of which our invention consists can be variously arranged and organized, and the invention is not limited to the exact arrangement and organization of these instrumentalities as herein set forth.

Figure 1 is a plan view of shears embodying our invention.

Figure 2 is a section on line 2—2 of Figure 1.

Figure 3 is a plan view of the blades in detached position.

Figure 4 is a side elevation of a portion of the shears.

Similar numerals indicate corresponding parts.

Referring to the drawing:

The shears are provided with blades 1 and 2, each of which is formed of substantially the same construction so that they can be blanked from the same die. Each blade has a pivot opening 3 to receive a pivot pin 4 in the form of a rivet.

The rear portion of each blade is inwardly offset to pass beyond the median line of the shears when assembled.

In rear of the pivot opening 3, each blade is provided with a triangular opening 5, with rounded walls at the apices of the triangle and disposed so that when the shears are closed the triangular openings overlap and a cam pin 6 in the form of a rivet is in the position shown in Figure 1 in the median line of pivot 4 and cam pin 6.

The cam pin 6 extends through the forward outer flanges 9 of handles 7 and 8 which are of channel formation, and the inner forward flange of each handle is cut away as at 10 for clearance with the blades.

The inner end of the blade 1 is pivoted at 11 to the handle 8 and the inner end of the blade 2 is pivoted at 12 to the handle 7.

The handles may be provided with pins 13 to receive a spring 14 tending to separate the handles, or the ends of such spring may be received in recesses 15 in the blades.

The blade 2 is cut out at its periphery to form a shoulder 16 to cooperate with a latch 17 mounted at its rear end on the pivot 11 and serving to retain the jaws in their closed position.

Each blade is cut away as at 18 to provide for proper clearance with its handle.

Each blade is provided with a cutting edge, the inner portion of which is substantially straight and merges into a portion curving outwardly to the point of the blade.

Each blade is provided with a bevel 21 which is rounded in proximity to the cutting edge by grinding so that a very strong cutting edge is provided.

Assuming now that the blades are in their open position and the handles 7 and 8 are pressed towards each other, the blades turn on their pivot 4 and the cam pin 6 carried by the handles and bearing against a wedge shaped wall of the openings 5, causes a very powerful closing movement to be imparted to the cutting blades.

It will be apparent that the shears have a fixed pivot 4, and the cam pin 6, connected with the forward ends of the handles is floating in the openings 5, and cooperates with a wedge shaped wall of an opening, which, when the shears are closed, extends to and beyond the median line of the shears, with the fixed pivot and cam pin substantially in the plane of such median line.

Having thus described our invention, what we claim as new and desire to secure by Letters Patent is:

1. Shears, comprising blades having a fixed pivot and having their rear end portions extending to opposite sides of the median line of the shears, and having overlapping openings, each with a wedge shaped wall extending towards and beyond said median line, handles pivoted to the rear ends of said blades, and a floating cam pin connected with the forward ends of the handles and extending through said openings and engaging the wedge shaped wall of each opening.

2. Shears, comprising blades having a fixed pivot and having their rear end portions extending to opposite sides of the median line of the shears, and having overlapping openings, each with a wedge shaped wall extending towards and beyond said median line, handles pivoted to the rear ends of said blades, and a floating cam pin connected with the forward ends of the handles and extending through said openings and engaging the wedge shaped wall of each opening, and said fixed pivot and cam pin when the shears are fully closed being disposed substantially in the plane of said median line.

3. Shears, comprising blades having a fixed pivot and having their rear end portions extending to opposite sides of the median line of the shears, and having overlapping openings, each with a wedge shaped wall extending towards and beyond said median line, said blades having a cutting edge extending forwardly substantially straight and then curving towards the point of the blade, with a bevel at the outer side of the cutting edge and with the bevel rounded in proximity to the cutting edge, handles pivoted to the rear ends of said blades, and a floating cam pin connected with the forward ends of the handles and extending through said openings and engaging the wedge shaped wall of each opening.

4. Shears, comprising blades having a fixed pivot and having their rear end portions extending to opposite sides of the median line of the shears, each blade being of the same construction and having a substantially triangularly shaped opening in rear of the fixed pivot, handles pivoted to the rear ends of the blades, and a cam pin secured to the forward ends of the handles and extending through the blade openings and in bearing engagement with walls thereof.

THOMAS S. VOSBIKIAN.
PETER S. VOSBIKIAN.